United States Patent
El-Barbari et al.

(10) Patent No.: US 9,847,731 B2
(45) Date of Patent: Dec. 19, 2017

(54) ELECTRICAL CONVERTER AND METHOD OF ASSEMBLING THE ELECTRICAL CONVERTER

(71) Applicant: General Electric Company, Schenectady, NY (US)

(72) Inventors: Farouk Said El-Barbari, Bavaria (DE); Simon Herbert Schramm, Bavaria (DE); Stefan Schroeder, Bavaria (DE); Alvaro Jorge Mari Curbelo, Bavaria (DE)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 14/806,929

(22) Filed: Jul. 23, 2015

(65) Prior Publication Data

US 2017/0025964 A1    Jan. 26, 2017

(51) Int. Cl.
*H02M 3/335*    (2006.01)
*H02M 3/337*    (2006.01)

(52) U.S. Cl.
CPC ..... *H02M 3/33584* (2013.01); *H02M 3/3376* (2013.01); *H02M 3/33576* (2013.01)

(58) Field of Classification Search
CPC .................................................. H02M 3/335
USPC ............. 363/17, 56.01, 56.02, 95, 98, 21.04
See application file for complete search history.

(56) References Cited

U.S. PATENT DOCUMENTS

| | | | | |
|---|---|---|---|---|
| 5,654,880 A | * | 8/1997 | Brkovic | H02M 1/4258 363/132 |
| 7,660,135 B2 | * | 2/2010 | Fang | H02M 1/40 363/17 |
| 7,768,800 B2 | * | 8/2010 | Mazumder | H02M 5/458 363/17 |
| 8,427,331 B2 | | 4/2013 | Hartman et al. | |
| 2003/0007376 A1 | * | 1/2003 | Brkovic | H02M 3/28 363/98 |
| 2012/0063184 A1 | * | 3/2012 | Mazumder | H02M 7/4807 363/98 |
| 2014/0268959 A1 | * | 9/2014 | Frohman | H02M 7/797 363/98 |
| 2014/0346962 A1 | * | 11/2014 | Sanders | H05B 33/0815 315/193 |

* cited by examiner

*Primary Examiner* — Adolf Berhane
*Assistant Examiner* — Nusrat Quddus
(74) *Attorney, Agent, or Firm* — Global Patent Operation; John A. Kramer

(57) ABSTRACT

A converter assembly and method are provided. The converter assembly includes a galvanic isolation device, first switching devices, and second switching devices. The switching devices are conductively coupled with each other and with opposite sides of the isolation device. The first switching devices control conduction of an input voltage, and the second switching devices control conduction of electric power. The first switching devices are configured to switch between an open state and a closed state at frequencies that are faster than frequencies at which the second switching devices switch between the open state and the closed state to control a shape of a waveform of the electric power.

19 Claims, 6 Drawing Sheets

ELECTRICAL CONVERTER AND METHOD OF ASSEMBLING THE ELECTRICAL CONVERTER

FIELD

Embodiments of the subject matter described herein relate to assemblies that convert electric current and/or control conduction of the current.

BACKGROUND

Converters can be used to control conduction of current between a power source and one or more loads. These converters can include transformers and switches. The switches control when and how much of the current is conducted to and/or from the transformers, and the transformers can increase or decrease voltage being conducted through the converters.

Typically, the voltage that is received by a converter and the voltage that is output from a converter is approximately the same (minus leakage current). As a result, the switches are the same type of switches (e.g., the switches have the same blocking voltages).

In order to increase the power that is transferred by a converter, a larger transformer may be required. But, certain uses of a converter are limited in space, complexity, and/or cost. Consequently, the size, complexity, and cost of the transformer in the converter may be limited. This can limit the power transfer capability of the converter.

BRIEF DESCRIPTION

In one embodiment, an assembly (e.g., a converter assembly) includes a galvanic isolation device, a first set of plural switching devices, and a second set of plural switching devices. The switching devices in the first set are conductively coupled with each other and with one side of the galvanic isolation device. The first set of switching devices is configured to be conductively coupled with a power source. Each of the switching devices in the first set is configured to switch between an open state to block conduction of electric current from the power source to the galvanic isolation device through the respective switch and a closed state to conduct the electric power from the power source toward the galvanic isolation device through the respective switch. The switching devices in the second set are conductively coupled with each other and with another side of the galvanic isolation device such that the first and second sets of switching devices are not conductively coupled with each other. The second set of switching devices is configured to be conductively coupled with an electronic load that is powered by the electric power supplied by the power source. Each of the switching devices in the second set is configured to switch between the open state to block conduction of the electric power from the galvanic isolation device toward the electronic load through the respective switch and the closed state to conduct the electric power from the galvanic isolation device toward the electronic load through the respective switch. The switching devices in the first set are configured to switch between the open state and the closed state at frequencies that are faster than frequencies at which the switching devices in the second set switch between the open state and the closed state during transfer of the electric power from the power source to the electric load.

In one embodiment, an assembly (e.g., a converter assembly) includes a galvanic isolation device, a first set of plural switching devices, and a second set of plural switching devices. The switching devices in the first set are conductively coupled with each other and with one side of the galvanic isolation device. The first set of switching devices is configured to be conductively coupled with a power source. Each of the switching devices in the first set is configured to switch between an open state to block conduction of electric current (also referred to herein as electric power) from the power source to the galvanic isolation device through the respective switch and a closed state to conduct the electric power from the power source toward the galvanic isolation device through the respective switch. The switching devices in the second set are conductively coupled with each other and with another side of the galvanic isolation device such that the first and second sets of switching devices are not conductively coupled with each other. The second set of switching devices is configured to be conductively coupled with an electronic load that is powered by the electric power supplied by the power source. Each of the switching devices in the second set is configured to switch between the open state to block conduction of the electric power from the galvanic isolation device toward the electronic load through the respective switch and the closed state to conduct the electric power from the galvanic isolation device toward the electronic load through the respective switch. The switching devices and isolation device operate to convert an input DC current into a different, output DC current (e.g., a larger or smaller output current).

In another embodiment, another assembly (e.g., a converter assembly) includes a first circuit leg including first and second semiconductor switching devices, a second circuit leg including third and fourth semiconductor switching devices conductively coupled with the first and second semiconductor switching devices in the first circuit leg, a third circuit leg including fifth and sixth semiconductor switching devices, and a fourth circuit leg including seventh and eighth semiconductor switching devices conductively coupled with the fifth and sixth semiconductor switching devices in the third circuit leg. Each of the first, second, third, fourth, fifth, sixth, seventh, and eighth semiconductor switching devices is configured to change to a closed state to conduct electric power and to change to an open state to stop conduction of the electric power. The assembly also includes a galvanic isolation device conductively coupled with the first and second circuit legs on a first side of the galvanic isolation device and with the third and fourth circuit legs on a second side of the galvanic isolation device. The galvanic isolation device is configured to transfer the electric power between the first and second sides without conductively coupling the first and second sides. The first, second, third, and fourth circuit legs and the galvanic isolation device are configured to one or more of convert a first voltage received by the first and second circuit legs into a different second voltage that is output from the third and fourth circuit legs or convert the second voltage received by the third and fourth circuit legs into the first voltage that is output from the first and second circuit legs by asymmetrically switching the first, second, third, and fourth semiconductor switching devices between the closed state and the open state at one or more frequencies that differ from one or more frequencies at which the fifth, sixth, seventh, and eighth semiconductor switching devices are switched between the closed state and the open state.

In another embodiment, a method (e.g., for asymmetrically controlling a converter assembly) includes, in a converter assembly that includes a first circuit leg including first and second semiconductor switching devices, a second circuit leg including third and fourth semiconductor switching devices conductively coupled with the first and second semiconductor switching devices in the first circuit leg, a third circuit leg including fifth and sixth semiconductor switching devices, a fourth circuit leg including seventh and eighth semiconductor switching devices conductively coupled with the fifth and sixth semiconductor switching devices in the fourth circuit leg, and a galvanic isolation device conductively coupled with the first and second circuit legs on a first side of the galvanic isolation device and with the third and fourth circuit legs on a second side of the galvanic isolation device where the galvanic isolation device configured to transfer electric power between the first and second sides without conductively coupling the first and second sides: receiving a first voltage on the first and second circuit legs, switching the first, second, third, and fourth semiconductor switching devices between a closed state and an open state, and switching the fifth, sixth, seventh, and eighth semiconductor switching devices between the closed state and the open state. The first, second, third, and fourth semiconductor switching devices are switched between the closed state and the open state at one or more frequencies that are greater than one or more frequencies at which the fifth, sixth, seventh, and eighth semiconductor switching devices are switched between the closed state and the open state. The method also includes outputting a second voltage that is larger than the first voltage from the third and fourth circuit legs.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments described herein provide converter assemblies and methods for controlling the conduction of electric power (e.g., electric current) to one or more loads. The converter assemblies can provide galvanic insulation between power sources and loads, and can use asymmetrical switching patterns to control the waveforms of the outgoing current that is supplied to the loads. The converter assemblies can be operated at different input and output voltage levels, which allows the usage of switching devices (such as insulated gate bipolar transistors, or IGBTs, or another device) having different voltage blocking capabilities on the input and output sides of the converter assemblies. Switching devices having lower blocking voltages typically also have lower switching losses, which can allow for these devices to be switched at a higher switching frequency than the switching devices on the other (e.g., output) side of the assemblies that have higher blocking voltages. The switching frequency of the switching devices on the output side of the converter assemblies can determine a fundamental operation frequency of the transformer and, consequently, a power rating of the transformer and a power rating of the converter assemblies.

The asymmetrical switching patterns can be useful for switching devices having low switching losses, such as semiconductor switching devices (e.g., IGBTs, metal-oxide-semiconductor field effect transistors or MOSFETs, etc.) based on Silicon Carbide (SiC) and having low blocking voltages (e.g., blocking voltages up to 1.7 kilovolts). The asymmetrical switching patterns can include switching the switching devices between open states and closed states at different frequencies on different sides of the converter assemblies (e.g., on different sides of a galvanic isolation device, such as a transformer, inductor, etc., in the converter assemblies). Having different switching frequencies on opposite sides of the transformer allows a user to control the waveform shape of current that is output from the converter assemblies or power transfer capability, while also substantially lowering leakage inductance of the transformer (which can be advantageous from a manufacturing perspective).

Figure 1:
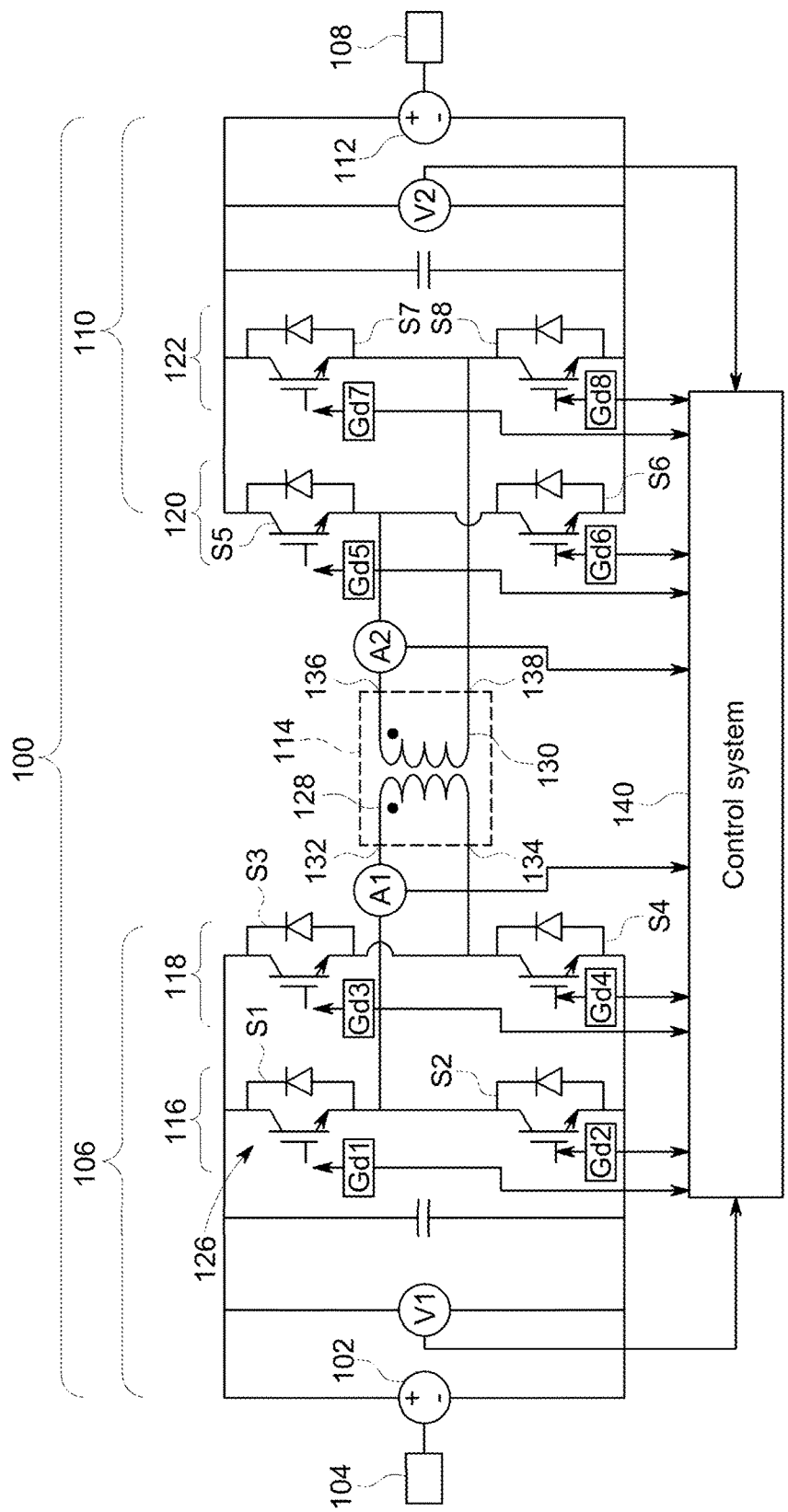
FIG. 1 illustrates one embodiment of a converter assembly.

FIG. 1 illustrates one embodiment of a converter assembly 100. The assembly 100 can be a DC to DC converter that receives current (e.g., DC current) at an input conductor 102 from one or more power sources 104 on one side 106 of the assembly 100 (also referred to as a primary side or input side), converts this current into a different current (e.g., a larger voltage and lower DC current), and then outputs the different current to one or more loads 108 via an opposite side 110 of the assembly 100 (also referred to as a secondary side or output side) and an output conductor 112. The different current also may be referred to as an output current. In one embodiment, the assembly 100 may be a bi-directional converter assembly that receives current from the loads 108, conducts and converts the current, and output a different current to the sources 104.

The sides 106, 110 of the assembly 100 are on opposite sides of a galvanic isolation device 114, such as a transformer. The galvanic isolation device 114 may convert the input current into the output current without providing a conductive pathway between the sides 106, 110 of the assembly 100. The galvanic isolation device 114 can include two or more conductive coils 128, 130 that are not conductively coupled with each other, but that can transfer electric power between the coils 128, 130 to convert the current (e.g., via one or more magnetic bodies).

Each side 106, 110 includes H-bridges having legs 116, 118, 120, 122 formed from switching devices 126 (e.g., also referred to as switching devices S1, S2, S3, S4, S5, S6, S7, S8) conductively coupled with each other (e.g., by wires, busses, etc.). The switching devices S1, S2 are conducted with each other in series and with a first end 132 of the coil 128 in the galvanic isolation device 114. The switching devices S3, S4 are conducted with each other in series and with an opposite, second end 134 of the coil 128 in the galvanic isolation device 114. The switching devices S5, S6 are conducted with each other in series and with a first end 136 of the coil 130 in the galvanic isolation device 114. The switching devices S7, S8 are conducted with each other in series and with an opposite, second end 138 of the coil 130 in the galvanic isolation device 114.

The switching devices 126 can include IGBTs formed from silicon carbide. Optionally, the switching devices 126 can be another type of semiconductor switching device (e.g., MOSFETs) and/or can be formed from another material. The switching devices 126 have blocking voltages that define how much control voltage is applied to the switching devices 126 (e.g., to gates of the switching devices 126) to activate the devices 126. Upon activation, a switching device 126 is in a closed state to conduct electric current through the switching device 126. The switching devices 126 can be deactivated to change to an open state to stop conducting current through the switching devices 126.

A control system 140 represents hardware circuitry that includes and/or is connected with one or more processors. The control system 140 operates to control which switching devices 126 are in the open or closed state. For example, the control system 140 can apply control voltages Gd1, Gd2, Gd3, Gd4, Gd5, Gd6, Gd7, Gd8 to the respective switching devices 126 as shown in FIG. 1 to control which switching devices 126 are closed and which are open. The voltage V1 can represent the control voltages applied to the switching devices 126 on one side 106 of the assembly 100 by the control system 140 and the voltage V2 can represent the control voltages applied to the switching devices 126 on the other side 110 of the assembly 100 by the control system 140.

The switching devices 126 can be opened and closed at the same frequency to control the conduction of current from the power source 104 to the load 108. This type of operation can be referred to as symmetric operation of a converter.

Figure 2:
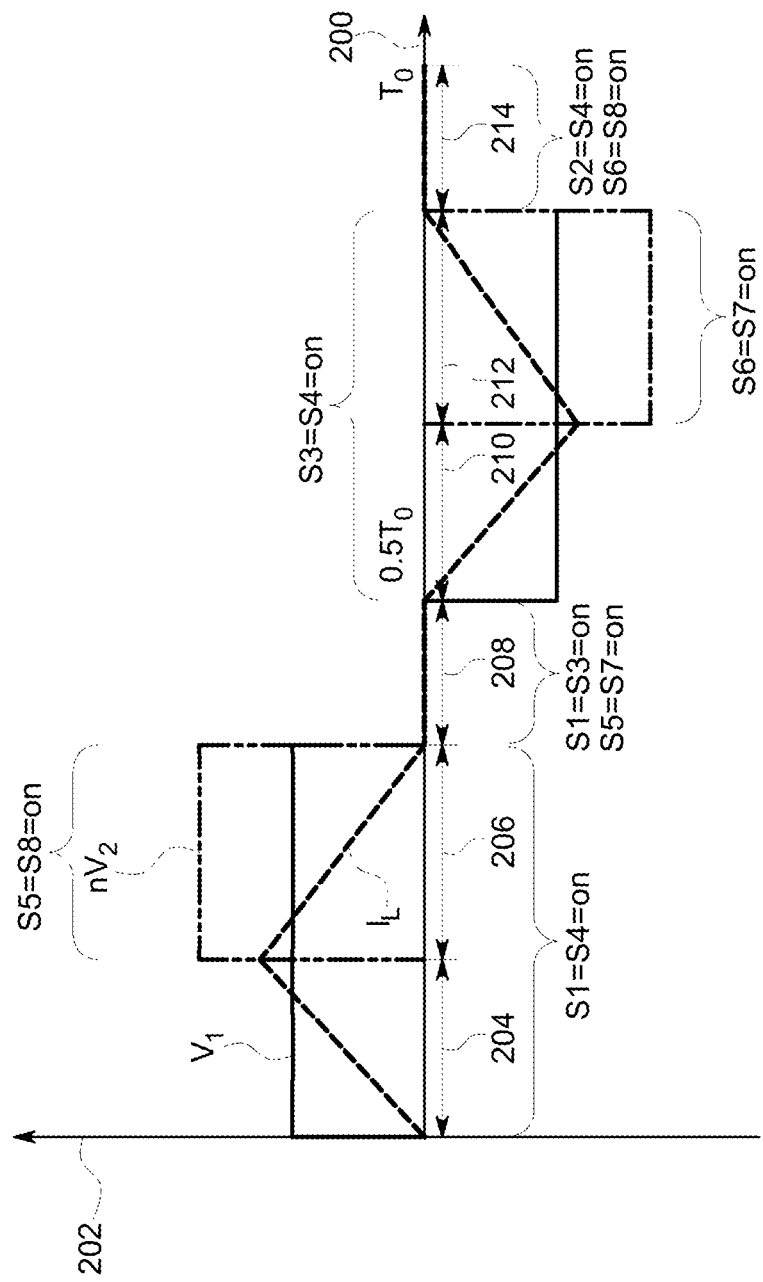
FIG. 2 illustrates voltages and current conducted through the converter assembly shown in FIG. 1 during symmetric operation of the assembly according to one example.

FIG. 2 illustrates voltages and current conducted through the assembly 100 during symmetric operation of the assembly 100 according to one example. The voltages and current shown in FIG. 2 include a primary side voltage $V_1$ (e.g., the control voltages applied to one or more of the switching devices 126 on the first side 106 of the assembly 100 by the control system 140), a secondary side voltage $nV_2$ (e.g., the control voltages applied to one or more of the switching devices 126 on the second side 110 of the assembly 100 by the control system 140), and an output current $I_L$ that is conducted from the power source 104, and through and out of the assembly 100 to the load 108. The voltages $V_1$, $nV_2$ and current $I_L$ are shown alongside a horizontal axis 200 representative of time and a vertical axis 202 representative of magnitudes of the voltages $V_1$, $nV_2$ and the current $I_L$. The scale of the vertical axis 202 may differ for the voltages $V_1$, $nV_2$ and/or the current $I_L$.

During symmetric operation of the assembly 100, the first and fourth switching devices S1, S4 on the first side 106 of the assembly 100 are turned on (e.g., closed) during a first time period 204. The remaining switching devices S2, S3, S5, S7, S8 are open. During a subsequent time period 206 (e.g., an immediately subsequent time period), the fifth and eighth switching devices S5, S8 on the second side 110 of the assembly 100 are closed while the first and fourth switching devices S1, S4 remain closed and the other switching devices S2, S3, S6, S7 remain open. The time periods 204, 206 may be equivalent in duration. During a subsequent time period 208 (also referred to as a zero crossing time period as the output current $I_L$ crosses the horizontal axis 200 during this time period), all switching devices 126 except for the first, third, fifth, and seventh switching devices S1, S3, S5, S7 are opened and the first, third, fifth, and seventh switching devices S1, S3, S5, S7 are closed. The time period 208 may be the same duration as the time periods 204, 206 or may be a different duration. During a subsequent time period 210, all switching devices 126 except for the third and fourth switching devices S3, S4 are opened and the third and fourth switching devices S3, S4 are closed. During a subsequent time period 212, the third and fourth switching devices S3, S4 remain closed and the sixth and seventh switching devices S6, S7 also are closed. The remaining switching devices 126 remain open. During a subsequent time period 214, the second, fourth, sixth, and eighth switching devices S2, S4, S6, S8 are closed and the remaining switching devices 126 are opened. The time periods 204, 206, 208, 210, 212, 214 may each be the same duration such that the changes in states of the switching devices 126 changes in a periodic or regular manner (e.g., the changes are symmetrical).

As shown in FIG. 2, the symmetric operation of the assembly 100 or the symmetric application of the control voltages V1, V2 causes the output current $I_L$ to have an approximately triangular waveform. The control voltages V1, V2 are applied symmetrically in that the control voltage V1 is applied for approximately the same or the exact same time periods before and after the output current $I_L$ crosses the horizontal axis 200 (e.g., the time periods 204, 206 before the zero crossing of the output current and the time periods 210, 212 after the zero crossing of the output current) and the control voltage V2 is applied for approximately the same or the exact same time periods before and after the output current IL crosses the horizontal axis 200 (e.g., the time period 206 before the zero crossing of the output current and the time period 212 after the zero crossing of the output current).

Using an asymmetric operation of the switching devices 126 (e.g., where the changes in states of the switching devices 126 does not change in a periodic or regular manner) can change the shape of the waveform of the output current $I_L$ to a more square or rectangular shape. For example, instead of having a waveform with a single peak on the positive side of the vertical axis 202 and a single peak on the negative side of the vertical axis 202 (as shown in FIG. 2), the waveform of the output current $I_L$ may have multiple peaks on the positive side of the vertical axis 202 before dropping into the negative side of the vertical axis 202, and may have multiple peaks on the negative side of the vertical axis 202. This change in the output current $I_L$ can result in improved power transfer capability of the assembly 100 from the power source 104 to the load 108.

Figure 3:
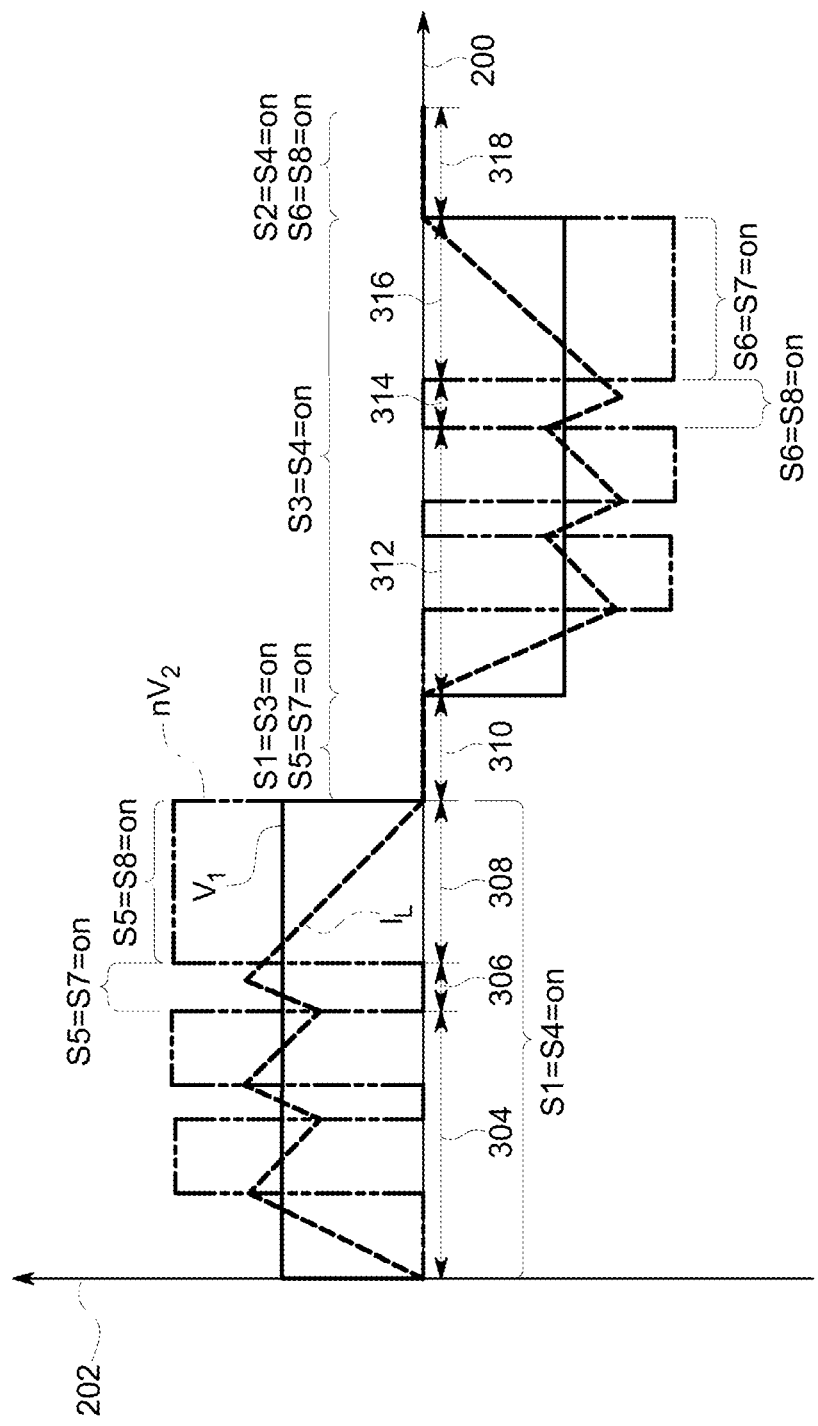
FIG. 3 illustrates voltages and current conducted through the converter assembly shown in FIG. 1 during asymmetric operation of the assembly according to one embodiment.

FIG. 3 illustrates voltages and current conducted through the assembly 100 during asymmetric operation of the assembly 100 according to one embodiment. The voltages and current shown in FIG. 3 include the primary side voltage $V_1$, the secondary side voltage $nV_2$, and the output current $I_L$. During asymmetric operation of the assembly 100, the first and fourth switching devices S1, S4 on the first side 106 of the assembly 100 are closed during a first time period 304 that can be longer than the first time period 204 of the symmetric operation shown in FIG. 2. The remaining switching devices 126 may be open.

During a subsequent second time period 306, the first and fourth switching devices S1, S4 remain closed and the fifth and seventh switching devices S5, S7 are closed. The remaining switching devices 126 may be open. During a subsequent third time period 308, the first, fourth, and fifth switching devices S1, S4, S5 remain closed while the seventh switching device S7 is opened and the eighth switching device S8 is closed. The remaining switching devices 126 may be open. As shown in FIG. 3, closing and opening the switching devices 126 on the opposite sides 106, 110 of the assembly 100 in this manner can cause the control voltage V1 to be applied over a longer time period than the control voltage V2 while the control voltage V2 is repeatedly applied and then removed from the side 110 of the assembly 100.

During a subsequent fourth time period 310 (also referred to as a zero crossing time period due to the output current $I_L$ crossing the horizontal axis 200 during this time period), the first, third, fifth, and seventh switching devices S1, S3, S5, S7 are closed. The remaining switching devices 126 may be open. During a subsequent fifth time period 312, the third and fourth switching devices S3, S4 are closed. The remaining switching devices 126 may be open. During a subsequent sixth time period 314, the third and fourth switching devices S3, S4 may remain closed while the sixth and seventh switching devices S6, S7 also are closed. The remaining switching devices 126 may be open. During a subsequent seventh time period 316, the third, fourth, and sixth switching devices S3, S4, S6 remain closed and the seventh switching device S7 is closed. The remaining switching devices 126 may be open. During a subsequent eighth time period 318, the second, fourth, sixth, and eighth switching devices S2, S4, S6, S8 are closed and the other switching devices 126 may be open.

As shown in FIG. 3, the asymmetric operation of the assembly 100 or the asymmetric application of the control voltages V1, V2 causes the output current $I_L$ to have a more rectangular or square shape compared to the symmetric operation of the assembly 100. The control voltages V1, V2 are applied asymmetrically in that the control voltages V1, V2 are applied for different durations and/or at different times. Using this asymmetric operation of the switching devices 126 can result in improved power transfer capability of the assembly 100 from the power source 104 to the load 108. For example, the power transferred by the assembly 100 can be represented by the area between the horizontal axis 200 and the waveform of the output current $I_L$. This area is larger for the more rectangular shaped waveform shown in FIG. 3 from asymmetric operation than for the more triangular shaped waveform shown in FIG. 2 from the symmetric operation. In one aspect, the asymmetric operation of the assembly 100 can allow for the assembly 100 to transfer the same amount of power that another symmetrically operated converter assembly is able to transfer, but with a smaller transformer. For example, the assembly 100 can be able to transfer the same power from the power source 104 to the load 108 as a converter assembly having a larger transformer when the assembly 100 is operated asymmetrically. Smaller transformers (e.g., medium frequency transformers) can be easier to manufacture, and can leak less current than larger transformers.

Figure 4:
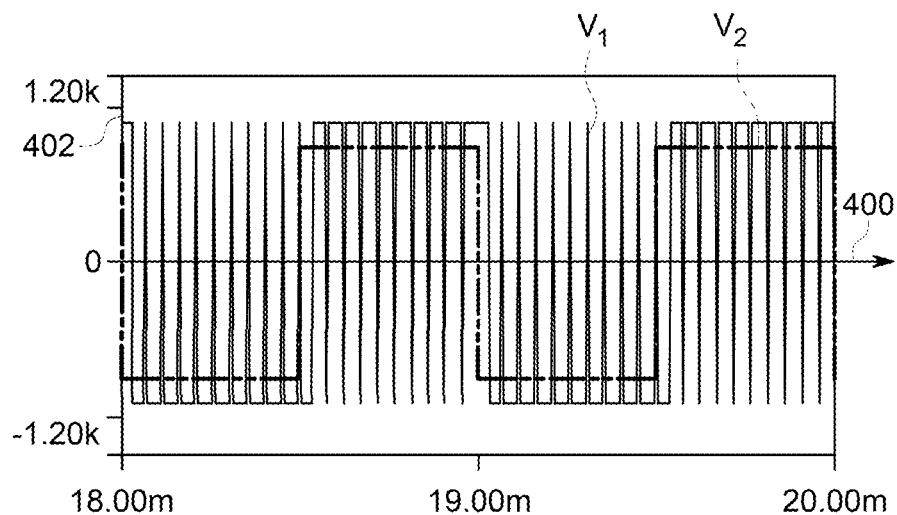
FIG. 4 illustrates another example of asymmetric operation of the converter assembly shown in FIG. 1.
Figure 5:
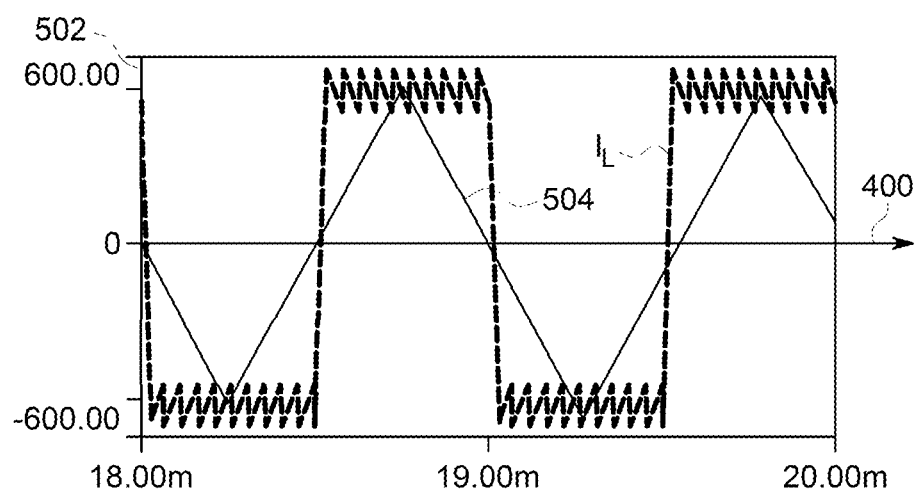
FIG. 5 illustrates an output current of the converter assembly shown in FIG. 1 when control voltages shown in FIG. 4 are used to asymmetrically control the assembly according to one example.

FIG. 4 illustrates another example of asymmetric operation of the assembly 100 shown in FIG. 1. FIG. 5 illustrates the output current $I_L$ of the assembly 100 when the control voltages $V_1$, $V_2$ shown in FIG. 4 are used to asymmetrically control the assembly 100 according to one example. The control voltages $V_1$, $V_2$ are shown in FIG. 4 along a horizontal axis 400 representative of time and a vertical axis 402 representative of magnitudes of the control voltages $V_1$, $V_2$. The output current $I_L$ is shown in FIG. 5 along the horizontal axis 400 and a vertical axis 502 representative of magnitudes of the output current $I_L$.

As shown in FIG. 4, the control voltages $V_1$ applied to the switching devices 126 on the first side 106 of the assembly 100 can be increased to close one or more of the switching devices S1, S2, S3, S4 at a much more rapid rate (e.g., a greater frequency) than the rate at which the control voltages $V_2$ are increased and applied to the switching devices 126 on the other side 110 of the assembly 100 to close one or more of the switching devices S5, S6, S7, S8. This asymmetric control of the switching devices 126 on the opposite sides 106, 110 of the assembly 100 can cause the output current $I_L$ to have a more rectangular waveform, as shown in FIG. 5.

A triangular waveform 504 that may be achieved by symmetrically operating the assembly 100 is shown in FIG. 5. The current $I_L$ shown in FIG. 5 has a less triangular and more rectangular waveform than the current $I_L$ shown in FIG. 3 in that the current $I_L$ of FIG. 5 does not increase from a zero crossing with the horizontal axis 400, reach a peak, and then decrease to another zero crossing with the horizontal axis 400. Instead, the waveform of the current $I_L$ shown in FIG. 5 increases at a faster rate (e.g., greater slope) from a zero crossing with the horizontal axis 400, remains elevated above the horizontal axis 400 for multiple peaks, and then returns to another zero crossing with the horizontal axis 400 at a faster rate. As shown by a comparison of the waveform of the current $I_L$ shown in FIG. 5 and the triangular waveform 504, more power is transferred by the assembly 100 by asymmetrically controlling the assembly 100 to achieve the non-triangular waveform shown in FIG. 5 than by symmetrically controlling the assembly 100 to achieve the triangular waveform 504.

Figure 6:
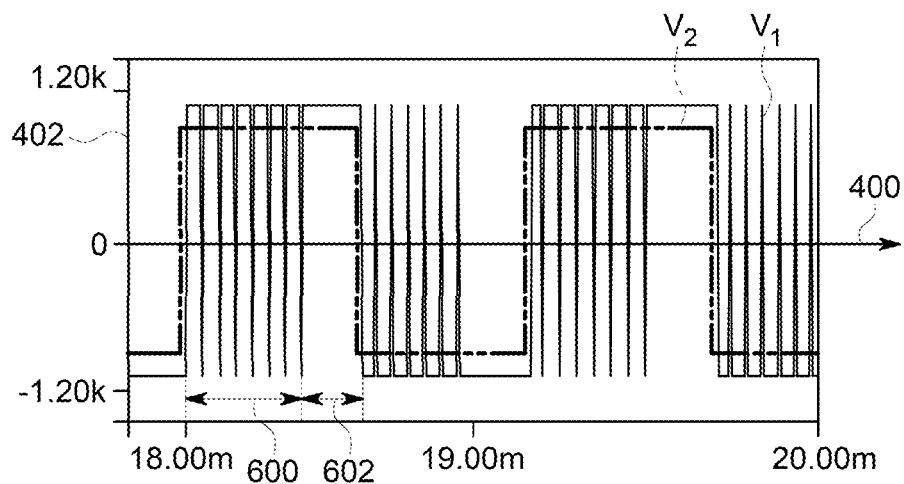
FIG. 6 illustrates another example of asymmetric operation of the converter assembly shown in FIG. 1.
Figure 7:
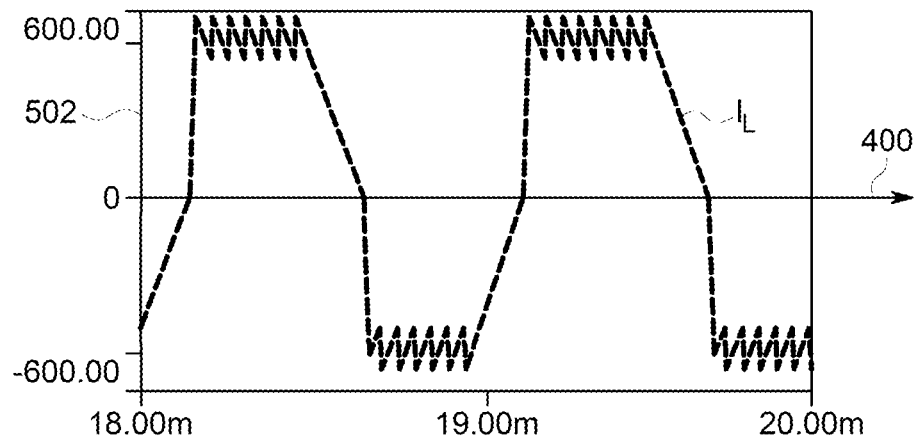
FIG. 7 illustrates the output current of the converter assembly shown in FIG. 1 when the control voltages shown in FIG. 6 are used to asymmetrically control the assembly according to one example.

FIG. 6 illustrates another example of asymmetric operation of the assembly 100 shown in FIG. 1. FIG. 7 illustrates the output current $I_L$ of the assembly 100 when the control voltages $V_1$, $V_2$ shown in FIG. 6 are used to asymmetrically control the assembly 100 according to one example. The control voltages $V_1$, $V_2$ are shown along the horizontal axis 400 and the vertical axis 402, and the output current $I_L$ is shown along the horizontal axis 400 and the vertical axis 502.

The rate at which control voltages $V_1$, $V_2$ are changed can be controlled in order to change the shape of the waveform of the output current $I_L$. In the example shown in FIGS. 4 and 5, the control voltage $V_1$ is varied between a peak positive value and a peak negative value at a regular or periodic rate and the control voltage $V_2$ is varied between another peak positive value and another peak negative value at a regular or periodic rate that differs from the rate at which the control voltage $V_1$ is varied. The resulting waveform of the current $I_L$ is shown in FIG. 5 and described above.

In contrast with FIGS. 6 and 7, however, the control voltage $V_1$ is varied between the peak positive and negative values at a regular or periodic rate during a first time period 600, and then is not varied (e.g., remains at the peak positive value or peak negative value) during a second time period 602. The control voltage $V_1$ can then return to being varied between the peak positive and negative values at a regular or periodic rate during another first time period 600, and then not be varied during another second time period 602. Changing the rate at which the control voltage $V_1$ is varied over time can cause the waveform of the output current $I_L$ to have a more tilted shape. For example, in the example shown in FIGS. 4 and 5, the rates at which the current $I_L$ increases from a zero crossing or decreases toward a zero crossing are the same or approximately the same. But, in the example shown in FIGS. 6 and 7, however, the current $I_L$ increases from a zero crossing with the horizontal axis 400 at a faster rate than the rate at which the current $I_L$ decreases toward a zero crossing with the horizontal axis 400. The rates at which the control voltages $V_1$ and/or $V_2$ are varied to close or open the switching devices 126 can be varied to control the shape of the waveform of the current $I_L$.

In one embodiment, the converter assembly 100 shown in FIG. 1 can include a DC to DC converter that receives current on one side 106 of the assembly 100, converts this current into a different current (e.g., a larger voltage and lower DC current), and then outputs the different current to one or more loads 108 via an opposite side 110 of the assembly 100. The switching devices 126 on either side of the assembly 100 may operate at the same or different frequencies. As a result, one embodiment of the assembly 100 includes plural SiC switches 126 on the side 106 of the assembly 100 and plural SiC switches 126 on the opposite side 110 of the assembly 100, and the isolation device 114 between the switches 126 on the side 106 and the switches 126 on the side 110.

Figure 8:
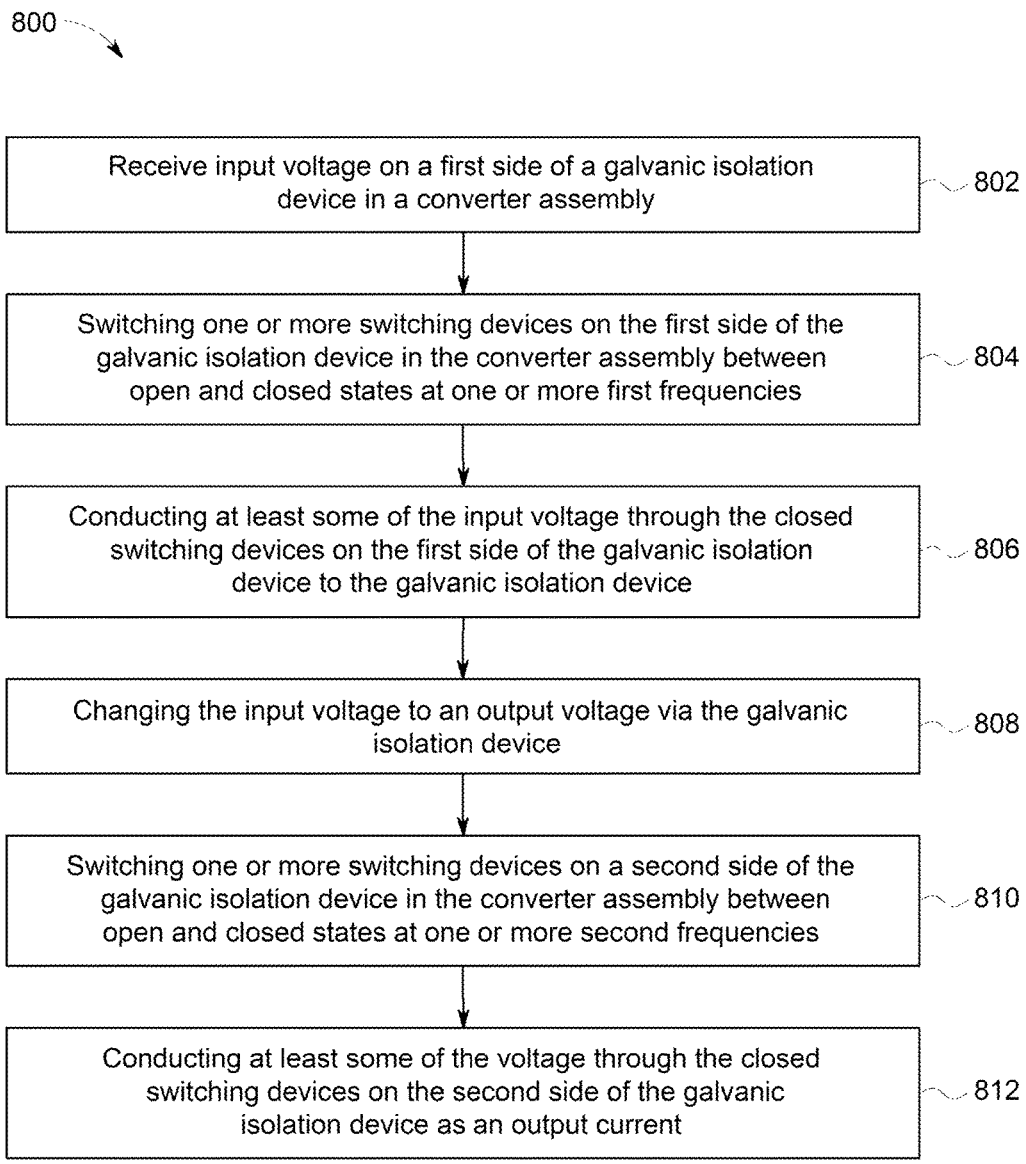
FIG. 8 illustrates a flowchart of one embodiment of a method for asymmetrically controlling a converter assembly.

FIG. 8 illustrates a flowchart of one embodiment of a method 800 for asymmetrically controlling a converter assembly. The method 800 may be performed with the converter assembly 100 shown and described herein to convert the voltage conducted between the power source 104 and the load 108. At 802, an input voltage is received on a first side of a galvanic isolation device in a converter assembly. For example, the power source 104 can supply an input voltage into the legs 116, 118 on the side 106 of the converter assembly 100. At 804, one or more switching devices in the first side of the galvanic isolation device are switched between open and closed states at one or more first frequencies. For example, one or more of the switching devices S1, S2, S3, S4 may repeatedly alternate between open and closed states.

At 806, at least some of the input voltage is conducted through the closed switching devices in the first side of the galvanic isolation device to the galvanic isolation device. At 808, the input voltage is changed by the galvanic isolation device. For example, a transformer can increase or decrease the voltage received by the transformer from the switching devices S1, S2, S3, and/or S4 that are closed. The transformer can transfer this voltage between the sides 106, 110 of the converter assembly 100 without conductively coupling the sides 106, 110 with each other.

At 810, one or more switching devices in the second side of the galvanic isolation device are switched between open and closed states at one or more second frequencies. For example, one or more of the switching devices S5, S6, S7, S8 may repeatedly alternate between open and closed states. As described above, the frequencies at which the switching devices S1, S2, S3, S4 are alternated between open and closed states can differ from the frequencies at which the switching devices S5, S6, S7, S8 are alternated between open and closed states in order to control the waveform of the current that is output from the converter assembly 100. At 812, at least some of the voltage that is received from the galvanic isolation device is conducted through the closed switching devices in the second side of the galvanic isolation device as an output current. This current can be supplied to the load 108.

In one embodiment, switching the switching devices S1, S2, S3, S4 at frequencies that are faster than the frequencies at which the switching devices S5, S6, S7, S8 switch states can cause the current that is output from the converter assembly 100 to have a waveform that is shaped more like a rectangle than a triangle. This can increase the power transfer capability of the converter assembly 100 without having to use larger transformers as the galvanic isolation device 114.

In one embodiment, an assembly (e.g., a converter assembly) includes a galvanic isolation device, a first set of plural switching devices, and a second set of plural switching devices. The switching devices in the first set are conductively coupled with each other and with one side of the galvanic isolation device. The first set of switching devices is configured to be conductively coupled with a power source. Each of the switching devices in the first set is configured to switch between an open state to block conduction of electric power from the power source to the galvanic isolation device through the respective switch and a closed state to conduct the electric power from the power source toward the galvanic isolation device through the respective switch. The switching devices in the second set are conductively coupled with each other and with another side of the galvanic isolation device such that the first and second sets of switching devices are not conductively coupled with each other. The second set of switching devices is configured to be conductively coupled with an electronic load that is powered by the electric power supplied by the power source. Each of the switching devices in the second set is configured to switch between the open state to block conduction of the electric power from the galvanic isolation device toward the electronic load through the respective switch and the closed state to conduct the electric power from the galvanic isolation device toward the electronic load through the respective switch. The switching devices in the first set are configured to switch between the open state and the closed state at frequencies that are faster than frequencies at which the switching devices in the second set switch between the open state and the closed state during transfer of the electric power from the power source to the electric load.

In one aspect, the assembly also includes a control system including one or more processors that control the frequencies at which the switching devices in the first set switch between the open state and the closed state and control the frequencies at which the switching devices in the second set switch between the open state and the closed state.

In one aspect, the control system is configured to control the frequencies at which the switching devices in the first set switch between the open state and closed state by applying a first control voltage to the switching devices in the first set that exceeds a first blocking voltage of the switching devices in the first set. The control system also is configured to control the frequencies at which the switching devices in the second set switch between the open state and closed state by applying a second control voltage to the switching devices in the second set that exceeds a second blocking voltage of the switching devices in the second set. The first and second blocking voltages differ from each other.

In one aspect, the first blocking voltage of the switching devices in the first set is smaller than the second blocking voltage of the switching devices in the second set.

In one aspect, the switching devices in the first set are configured to switch between the open state and the closed state at frequencies that are faster than frequencies at which the switching devices in the second set switch between the open state and the closed state during conduction of the electric power from the power source to the electric load in order to cause the electric power that is supplied to the electric load to have a rectangular waveform.

In one aspect, the galvanic isolation device includes a transformer having first and second conductive coils. The first set of the switching devices includes first and second switching devices conductively coupled with each other and with a first end of the first coil of the transformer. The first set of the switching devices includes third and fourth switching devices conductively coupled with each other and with an opposite, second end of the first coil of the transformer.

In one aspect, the second set of the switching devices includes fifth and sixth switching devices conductively coupled with each other and with a first end of the second coil of the transformer. The second set of the switching devices includes seventh and eighth switching devices conductively coupled with each other and with an opposite, second end of the second coil of the transformer.

In one aspect, the assembly also includes a control system configured to control the frequencies at which the switching devices in the first and second sets switch between the closed state and the open state. The control system is configured to direct the first and fourth switching devices to be in the closed state and the second, third, fifth, sixth, seventh, and eighth switching devices to be in the open state during a first time period; direct the first, fourth, fifth, and seventh switching devices to be in the closed state and the second, third, and eighth semiconductor switching devices to be in the open state during a subsequent, second time period; direct the first, fourth, fifth, and eighth switching devices to be in the closed state and the second, third, sixth, and seventh switching devices to be in the open state during a subsequent, third time period; direct the first, third, fifth, and seventh switching devices to be in the closed state and the second, fourth, sixth, and eighth switching devices to be in the open state during a subsequent, fourth time period; direct the third and fourth switching devices to be in the closed state and the first, second, fifth, sixth, seventh, and eighth switching devices to be in the open state during a subsequent, fifth time period; direct the third, fourth, sixth, and eighth switching devices to be in the closed state and the first, second, fifth, and seventh switching devices to be in the open state during a subsequent, sixth time period; direct the third, fourth, sixth, and seventh switching devices to be in the closed state and the first, second, fifth, and eighth switching devices to be in the open state during a subsequent, seventh time period; and direct the second, fourth, sixth, and eighth switching devices to be in the closed state and the first, third, fifth, and seventh switching devices to be in the open state during a subsequent eighth time period.

In one aspect, the switching devices in the first set and in the second set include semiconductor switching devices comprising silicon carbide.

In one embodiment, an assembly (e.g., a converter assembly) includes a galvanic isolation device, a first set of plural switching devices, and a second set of plural switching devices. The switching devices in the first set are conductively coupled with each other and with one side of the galvanic isolation device. The first set of switching devices is configured to be conductively coupled with a power source. Each of the switching devices in the first set is configured to switch between an open state to block conduction of electric current (also referred to herein as electric power) from the power source to the galvanic isolation device through the respective switch and a closed state to conduct the electric power from the power source toward the galvanic isolation device through the respective switch. The switching devices in the second set are conductively coupled with each other and with another side of the galvanic isolation device such that the first and second sets of switching devices are not conductively coupled with each other. The second set of switching devices is configured to be conductively coupled with an electronic load that is powered by the electric power supplied by the power source. Each of the switching devices in the second set is configured to switch between the open state to block conduction of the electric power from the galvanic isolation device toward the electronic load through the respective switch and the closed state to conduct the electric power from the galvanic isolation device toward the electronic load through the respective switch. The switching devices and isolation device operate to convert an input DC current into a different, output DC current (e.g., a larger or smaller output current).

In another embodiment, another assembly (e.g., a converter assembly) includes a first circuit leg including first and second semiconductor switching devices, a second circuit leg including third and fourth semiconductor switching devices conductively coupled with the first and second semiconductor switching devices in the first circuit leg, a third circuit leg including fifth and sixth semiconductor switching devices, and a fourth circuit leg including seventh and eighth semiconductor switching devices conductively coupled with the fifth and sixth semiconductor switching devices in the third circuit leg. Each of the first, second, third, fourth, fifth, sixth, seventh, and eighth semiconductor switching devices is configured to change to a closed state to conduct electric power and to change to an open state to stop conduction of the electric power. The assembly also includes a galvanic isolation device conductively coupled with the first and second circuit legs on a first side of the galvanic isolation device and with the third and fourth circuit legs on a second side of the galvanic isolation device. The galvanic isolation device is configured to transfer the electric power between the first and second sides without conductively coupling the first and second sides. The first, second, third, and fourth circuit legs and the galvanic isolation device are configured to one or more of convert a first voltage received by the first and second circuit legs into a different second voltage that is output from the third and fourth circuit legs or convert the second voltage received by the third and fourth circuit legs into the first voltage that is output from the first and second circuit legs by asymmetrically switching the first, second, third, and fourth semiconductor switching devices between the closed state and the open state at one or more frequencies that differ from one or more frequencies at which the fifth, sixth, seventh, and eighth semiconductor switching devices are switched between the closed state and the open state.

In one aspect, the second voltage is larger than the first voltage, and the first, second, third, and fourth circuit legs and the galvanic isolation device are configured to one or more of convert the smaller first voltage into the larger second voltage by asymmetrically switching the first, second, third, and fourth semiconductor switching devices between the closed state and the open state at the one or more frequencies that are greater than the one or more frequencies at which the fifth, sixth, seventh, and eighth semiconductor switching devices are switched between the closed state and the open state.

In one aspect, the first, second, third, fourth, fifth, sixth, seventh, and eighth semiconductor switching devices include silicon carbide insulated gate bipolar transistors.

In one aspect, the first, second, third, and fourth semiconductor switching devices have a lower blocking voltage than the fifth, sixth, seventh, and eighth semiconductor switching devices.

In one aspect, the first and second circuit legs are conductively coupled with each other in parallel between the galvanic isolation device and a source of the first voltage and the third and fourth circuit legs are conductively coupled with each other in parallel between the galvanic isolation device and an output of the second voltage.

In one aspect, the galvanic isolation device includes a transformer.

In one aspect, the transformer includes first and second conductive coils extending around one or more magnetic bodies but not conductively coupled with each other. The first circuit leg is conductively coupled with a first end of the first conductive coil, the second circuit leg is conductively coupled with a different, second end of the first conductive coil, the third circuit leg is conductively coupled with a first end of the second conductive coil, and the fourth circuit leg is conductively coupled with a different, second end of the second conductive coil.

In one aspect, the assembly also includes a control system configured to control the frequencies at which the first, second, third, and fourth semiconductor switching devices switch between the closed state and the open state. The control system is configured to direct the first and fourth semiconductor switching devices to be in the closed state and the second, third, fifth, sixth, seventh, and eighth semiconductor switching devices to be in the open state during a first time period; direct the first, fourth, fifth, and seventh semiconductor switching devices to be in the closed state and the second, third, and eighth semiconductor switching devices to be in the open state during a subsequent, second time period; direct the first, fourth, fifth, and eighth semiconductor switching devices to be in the closed state and the second, third, sixth, and seventh semiconductor switching devices to be in the open state during a subsequent, third time period; direct the first, third, fifth, and seventh semiconductor switching devices to be in the closed state and the second, fourth, sixth, and eighth semiconductor switching devices to be in the open state during a subsequent, fourth time period; direct the third and fourth semiconductor switching devices to be in the closed state and the first, second, fifth, sixth, seventh, and eighth semiconductor switching devices to be in the open state during a subsequent, fifth time period; direct the third, fourth, sixth, and eighth semiconductor switching devices to be in the closed state and the first, second, fifth, and seventh semiconductor switching devices to be in the open state during a subsequent, sixth time period; direct the third, fourth, sixth, and seventh semiconductor switching devices to be in the closed state and the first, second, fifth, and eighth semiconductor switching devices to be in the open state during a subsequent, seventh time period; and direct the second, fourth, sixth, and eighth semiconductor switching devices to be in the closed state and the first, third, fifth, and seventh semiconductor switching devices to be in the open state during a subsequent eighth time period.

In another embodiment, a method (e.g., for asymmetrically controlling a converter assembly) includes, in a converter assembly that includes a first circuit leg including first and second semiconductor switching devices, a second circuit leg including third and fourth semiconductor switching devices conductively coupled with the first and second semiconductor switching devices in the first circuit leg, a third circuit leg including fifth and sixth semiconductor switching devices, a fourth circuit leg including seventh and eighth semiconductor switching devices conductively coupled with the fifth and sixth semiconductor switching devices in the fourth circuit leg, and a galvanic isolation device conductively coupled with the first and second circuit legs on a first side of the galvanic isolation device and with the third and fourth circuit legs on a second side of the galvanic isolation device where the galvanic isolation device configured to transfer electric power between the first and second sides without conductively coupling the first and second sides: receiving a first voltage on the first and second circuit legs, switching the first, second, third, and fourth semiconductor switching devices between a closed state and an open state, and switching the fifth, sixth, seventh, and eighth semiconductor switching devices between the closed state and the open state. The first, second, third, and fourth semiconductor switching devices are switched between the closed state and the open state at one or more frequencies that are greater than one or more frequencies at which the fifth, sixth, seventh, and eighth semiconductor switching devices are switched between the closed state and the open state. The method also includes outputting a second voltage that is larger than the first voltage from the third and fourth circuit legs.

In one aspect, switching the first, second, third, and fourth semiconductor switching devices includes applying a first control voltage to the first, second, third, and fourth semiconductor switching devices that exceeds a first blocking voltage of the first, second, third, and fourth semiconductor devices. Switching the fifth, sixth, seventh, and eighth semiconductor switching devices can include applying a second control voltage to the fifth, sixth, seventh, and eighth semiconductor switching devices that exceeds a second blocking voltage of the fifth, sixth, seventh, and eighth semiconductor switching devices, and wherein the first blocking voltage is smaller than the second blocking voltage.

In one aspect, switching the first, second, third, and fourth semiconductor switching devices and switching the fifth, sixth, seventh, and eighth semiconductor switching devices includes switching the first and fourth semiconductor switching devices to the closed state and the second, third, fifth, sixth, seventh, and eighth semiconductor switching devices to the open state during a first time period; switching the fifth and seventh semiconductor switching devices to the closed state during a subsequent, second time period; switching the eighth semiconductor switching device to the closed state and the seventh semiconductor switching device to the open state during a subsequent, third time period; switching the third and seventh semiconductor switching devices to the closed state and the fourth semiconductor switching device to the open state during a subsequent, fourth time period; switching the fourth semiconductor switching device to the closed state and the seventh semiconductor switching device to the open state during a subsequent, fifth time period; switching the sixth and eighth semiconductor switching devices to the closed state during a subsequent, sixth time period; switching the seventh semiconductor switching device to the closed state and the eighth semiconductor switching device to the open state during a subsequent, seventh time period; and switching the second and eighth semiconductor switching devices to the closed state and the third semiconductor switching device to the open state during a subsequent, eighth time period.

In another embodiment, an assembly includes a galvanic isolation device, a first set of plural switching devices (e.g., SiC transistors), a second set of plural switching devices (e.g., SiC transistors), and a control system. The first set of plural switching devices is conductively coupled with one side of the galvanic isolation device and configured to be conductively coupled with a power source. The switching devices in the first set are configured to switch between an open state and a closed state (and/or an off state and an on state). The second set of plural switching devices is conductively coupled with another side of the galvanic isolation device such that the first and second sets of switching devices are not conductively coupled with each other. The second set of switching devices is configured to be conductively coupled with a load and is configured to switch between the open state and the closed state (and/or the off state and the on state). The control system (e.g., including one or more processors) is configured to control the switching devices in the first set to switch between the open state and the closed state at frequencies that are faster than frequencies at which the control system is configured to switch the switching devices in the second set between the open state and the closed state (and/or the off state and the on state) during transfer of electric power from the power source to the load. In other words, the control system is configured to control switching of the first set at one or more first frequencies and to control switching of the second set at one or more second frequencies, with the first frequencies being faster than the second frequencies. In embodiments, this does not preclude alternative modes of operation where the second frequencies are faster or the same as the first frequencies, although in one mode of operation, for a given time period for transferring power from the source to the load, the first frequencies are all faster than the second frequencies.

In another embodiment of the system, the control system is configured to control switching of the switching devices at the one or more first frequencies and the one or more second frequencies to convert DC power from the power source, at a first DC voltage level, to DC power applied to the load, at a second DC voltage level that is different than the first DC voltage level.

In another embodiment, an assembly (e.g., DC-to-DC power converter) includes a galvanic isolation device (e.g., a transformer or inductor), a first set of plural switching devices (e.g., SiC transistors), a second set of plural switching devices (e.g., SiC transistors), and control system. The first set of plural switching devices is conductively coupled with one side of the galvanic isolation device and is configured to be conductively coupled to receive DC power, at a first DC voltage level, from a power source. The second set of plural switching devices is conductively coupled with another side of the galvanic isolation device such that the first and second sets of switching devices are not conductively coupled with each other. The second set of switching devices is configured to be conductively coupled with a load. The control system is configured to control on and off switching of the switching devices in the first set at one or more first frequencies and to control on and off switching of the switching devices in the second set at one or more second frequencies that are slower than the one or more first frequencies, to convert the DC power from the power source to DC power applied to the load at a second DC voltage level that is different than the first DC voltage level.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An assembly comprising:
   a galvanic isolation device;
   a first set of plural switching devices conductively coupled with each other and with one side of the galvanic isolation device, the first set of switching devices configured to be conductively coupled with a power source, each of the switching devices in the first set configured to switch between an open state to block conduction of electric power from the power source to the galvanic isolation device through the respective switch and a closed state to conduct the electric power from the power source toward the galvanic isolation device through the respective switching device;

a second set of plural switching devices conductively coupled with each other and with another side of the galvanic isolation device such that the first and second sets of switching devices are not conductively coupled with each other, the second set of switching devices configured to be conductively coupled with a load that is powered by the electric power supplied by the power source, each of the switching devices in the second set configured to switch between the open state to block conduction of the electric power from the galvanic isolation device toward the load through the respective switch and the closed state to conduct the electric power from the galvanic isolation device toward the load through the respective switch; and a control system including one or more processors that control the frequencies at which the switching devices in the first set switch between the open state and the closed state and control the frequencies at which the switching devices in the second set switch between the open state and the closed state;

wherein the switching devices in the first set are configured to switch between the open state and the closed state at frequencies that are faster than frequencies at which the switching devices in the second set switch between the open state and the closed state during transfer of the electric power from the power source to the load.

2. The assembly of claim 1, wherein the control system is configured to control the frequencies at which the switching devices in the first set switch between the open state and closed state by applying a first control voltage to the switching devices in the first set that exceeds a first blocking voltage of the switching devices in the first set, and the control system is configured to control the frequencies at which the switching devices in the second set switch between the open state and closed state by applying a second control voltage to the switching devices in the second set that exceeds a second blocking voltage of the switching devices in the second set, wherein the first and second blocking voltages differ from each other.

3. The assembly of claim 2, wherein the first blocking voltage of the switching devices in the first set is smaller than the second blocking voltage of the switching devices in the second set.

4. The assembly of claim 1, wherein the switching devices in the first set are configured to switch between the open state and the closed state at frequencies that are faster than frequencies at which the switching devices in the second set switch between the open state and the closed state during conduction of the electric power from the power source to the electric load in order to cause the electric power that is supplied to the electric load to have a rectangular waveform.

5. The assembly of claim 1, wherein the galvanic isolation device includes a transformer having first and second conductive coils, the first set of the switching devices includes first and second switching devices conductively coupled with each other and with a first end of the first coil of the transformer, and the first set of the switching devices includes third and fourth switching devices conductively coupled with each other and with an opposite, second end of the first coil of the transformer.

6. The assembly of claim 5, wherein the second set of the switching devices includes fifth and sixth switching devices conductively coupled with each other and with a first end of the second coil of the transformer, and the second set of the switching devices includes seventh and eighth switching devices conductively coupled with each other and with an opposite, second end of the second coil of the transformer.

7. The assembly of claim 6, wherein the control system is further configured to:

direct the first and fourth switching devices to be in the closed state and the second, third, fifth, sixth, seventh, and eighth switching devices to be in the open state during a first time period, direct the first, fourth, fifth, and seventh switching devices to be in the closed state and the second, third, and eighth switching devices to be in the open state during a subsequent, second time period, direct the first, fourth, fifth, and eighth switching devices to be in the closed state and the second, third, sixth, and seventh switching devices to be in the open state during a subsequent, third time period, direct the first, third, fifth, and seventh switching devices to be in the closed state and the second, fourth, sixth, and eighth switching devices to be in the open state during a subsequent, fourth time period, direct the third and fourth switching devices to be in the closed state and the first, second, fifth, sixth, seventh, and eighth switching devices to be in the open state during a subsequent, fifth time period, direct the third, fourth, sixth, and eighth switching devices to be in the closed state and the first, second, fifth, and seventh switching devices to be in the open state during a subsequent, sixth time period, direct the third, fourth, sixth, and seventh switching devices to be in the closed state and the first, second, fifth, and eighth switching devices to be in the open state during a subsequent, seventh time period, and direct the second, fourth, sixth, and eighth switching devices to be in the closed state and the first, third, fifth, and seventh switching devices to be in the open state during a subsequent eighth time period.

8. The assembly of claim 1, wherein the switching devices in the first set and in the second set include semiconductor switching devices comprising silicon carbide.

9. An assembly comprising:

a first circuit leg including first and second semiconductor switching devices;

a second circuit leg including third and fourth semiconductor switching devices conductively coupled with the first and second semiconductor switching devices in the first circuit leg;

a third circuit leg including fifth and sixth semiconductor switching devices;

a fourth circuit leg including seventh and eighth semiconductor switching devices conductively coupled with the fifth and sixth semiconductor switching devices in the third circuit leg, wherein each of the first, second, third, fourth, fifth, sixth, seventh, and eighth semiconductor switching devices is configured to change to a closed state to conduct electric power and to change to an open state to stop conduction of the electric power; and a galvanic isolation device conductively coupled with the first and second circuit legs on a first side of the galvanic isolation device and with the third and fourth circuit legs on a second side of the galvanic isolation device, the galvanic isolation device configured to transfer the electric power between the first and second sides without conductively coupling the first and second sides;

wherein the first, second, third, and fourth circuit legs and the galvanic isolation device are configured to one or more of convert a first voltage received by the first and second circuit legs into a different second voltage that is output from the third and fourth circuit legs or convert the second voltage received by the third and fourth circuit legs into the first voltage that is output from the first and second circuit legs by asymmetrically switching the first, second, third, and fourth semiconductor switching devices between the closed state and the open state at one or more frequencies that differ from one or more frequencies at which the fifth, sixth, seventh, and eighth semiconductor switching devices are switched between the closed state and the open state.

10. The assembly of claim 9, wherein the second voltage is larger than the first voltage, and the first, second, third, and fourth circuit legs and the galvanic isolation device are configured to one or more of convert the smaller first voltage into the larger second voltage by asymmetrically switching the first, second, third, and fourth semiconductor switching devices between the closed state and the open state at the one or more frequencies that are greater than the one or more frequencies at which the fifth, sixth, seventh, and eighth semiconductor switching devices are switched between the closed state and the open state.

11. The assembly of claim 9, wherein the first, second, third, fourth, fifth, sixth, seventh, and eighth semiconductor switching devices include silicon carbide insulated gate bipolar transistors.

12. The assembly of claim 9, wherein the first, second, third, and fourth semiconductor switching devices have a lower blocking voltage than the fifth, sixth, seventh, and eighth semiconductor switching devices.

13. The assembly of claim 9, wherein the first and second circuit legs are conductively coupled with each other in parallel between the galvanic isolation device and a source of the first voltage and the third and fourth circuit legs are conductively coupled with each other in parallel between the galvanic isolation device and an output of the second voltage.

14. The assembly of claim 9, wherein the galvanic isolation device includes a transformer.

15. The assembly of claim 14, wherein the transformer includes first and second conductive coils extending around one or more magnetic bodies but not conductively coupled with each other, and wherein the first circuit leg is conductively coupled with a first end of the first conductive coil, the second circuit leg is conductively coupled with a different, second end of the first conductive coil, the third circuit leg is conductively coupled with a first end of the second conductive coil, and the fourth circuit leg is conductively coupled with a different, second end of the second conductive coil.

16. The assembly of claim 14, further comprising a control system configured to control the frequencies at which the first, second, third, and fourth semiconductor switching devices switch between the closed state and the open state, the control system configured to:

direct the first and fourth semiconductor switching devices to be in the closed state and the second, third, fifth, sixth, seventh, and eighth semiconductor switching devices to be in the open state during a first time period, direct the first, fourth, fifth, and seventh semiconductor switching devices to be in the closed state and the second, third, and eighth semiconductor switching devices to be in the open state during a subsequent, second time period, direct the first, fourth, fifth, and eighth semiconductor switching devices to be in the closed state and the second, third, sixth, and seventh semiconductor switching devices to be in the open state during a subsequent, third time period, direct the first, third, fifth, and seventh semiconductor switching devices to be in the closed state and the second, fourth, sixth, and eighth semiconductor switching devices to be in the open state during a subsequent, fourth time period, direct the third and fourth semiconductor switching devices to be in the closed state and the first, second, fifth, sixth, seventh, and eighth semiconductor switching devices to be in the open state during a subsequent, fifth time period, direct the third, fourth, sixth, and eighth semiconductor switching devices to be in the closed state and the first, second, fifth, and seventh semiconductor switching devices to be in the open state during a subsequent, sixth time period, direct the third, fourth, sixth, and seventh semiconductor switching devices to be in the closed state and the first, second, fifth, and eighth semiconductor switching devices to be in the open state during a subsequent, seventh time period, and direct the second, fourth, sixth, and eighth semiconductor switching devices to be in the closed state and the first, third, fifth, and seventh semiconductor switching devices to be in the open state during a subsequent eighth time period.

17. A method comprising:

in a converter assembly that includes a first circuit leg including first and second semiconductor switching devices, a second circuit leg including third and fourth semiconductor switching devices conductively coupled with the first and second semiconductor switching devices in the first circuit leg, a third circuit leg including fifth and sixth semiconductor switching devices, a fourth circuit leg including seventh and eighth semiconductor switching devices conductively coupled with the fifth and sixth semiconductor switching devices in the fourth circuit leg, and a galvanic isolation device conductively coupled with the first and second circuit legs on a first side of the galvanic isolation device and with the third and fourth circuit legs on a second side of the galvanic isolation device where the galvanic isolation device configured to transfer electric power between the first and second sides without conductively coupling the first and second sides, receiving a first voltage on the first and second circuit legs;

switching the first, second, third, and fourth semiconductor switching devices between a closed state and an open state;

switching the fifth, sixth, seventh, and eighth semiconductor switching devices between the closed state and the open state, wherein the first, second, third, and fourth semiconductor switching devices are switched between the closed state and the open state at one or more frequencies that are greater than one or more frequencies at which the fifth, sixth, seventh, and eighth semiconductor switching devices are switched between the closed state and the open state; and outputting a second voltage that is larger than the first voltage from the third and fourth circuit legs.

18. The method of claim 17, wherein switching the first, second, third, and fourth semiconductor switching devices includes applying a first control voltage to the first, second, third, and fourth semiconductor switching devices that exceeds a first blocking voltage of the first, second, third, and fourth semiconductor devices, wherein switching the fifth, sixth, seventh, and eighth semiconductor switching devices includes applying a second control voltage to the fifth, sixth, seventh, and eighth semiconductor switching devices that exceeds a second blocking voltage of the fifth, sixth, seventh, and eighth semiconductor switching devices, and wherein the first blocking voltage is smaller than the second blocking voltage.

19. The method of claim 17, wherein switching the first, second, third, and fourth semiconductor switching devices and switching the fifth, sixth, seventh, and eighth semiconductor switching devices includes:

switching the first and fourth semiconductor switching devices to the closed state and the second, third, fifth, sixth, seventh, and eighth semiconductor switching devices to the open state during a first time period, switching the fifth and seventh semiconductor switching devices to the closed state during a subsequent, second time period, switching the eighth semiconductor switching device to the closed state and the seventh semiconductor switching device to the open state during a subsequent, third time period, switching the third and seventh semiconductor switching devices to the closed state and the fourth semiconductor switching device to the open state during a subsequent, fourth time period, switching the fourth semiconductor switching device to the closed state and the seventh semiconductor switching device to the open state during a subsequent, fifth time period, switching the sixth and eighth semiconductor switching devices to the closed state during a subsequent, sixth time period, switching the seventh semiconductor switching device to the closed state and the eighth semiconductor switching device to the open state during a subsequent, seventh time period, and switching the second and eighth semiconductor switching devices to the closed state and the third semiconductor switching device to the open state during a subsequent, eighth time period.

* * * * *